C. H. ALLEN.
Hame Attachment.
No. 214,745. Patented April 29, 1879.
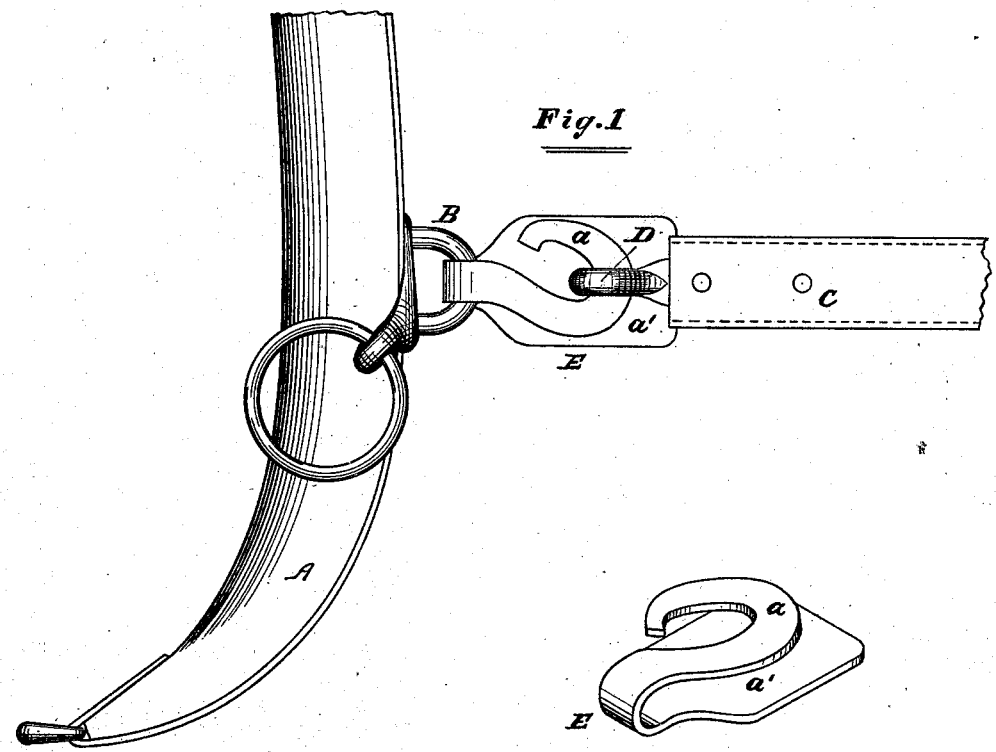
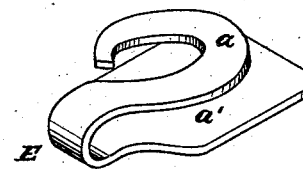
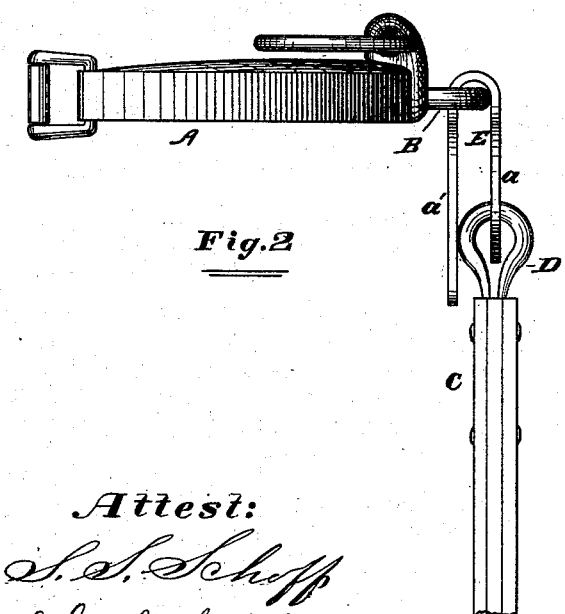
Attest:
S. S. Schoff
Charles H. Schoff
INVENTOR
Cotton H. Allen
By F. F. Warner, his
Attorney.

UNITED STATES PATENT OFFICE.

COTTON H. ALLEN, OF CHICAGO, ILLINOIS.

IMPROVEMENT IN HAME ATTACHMENTS.

Specification forming part of Letters Patent No. 214,745, dated April 29, 1879; application filed August 9, 1878.

*To all whom it may concern:*

Be it known that I, COTTON H. ALLEN, of Chicago, in the county of Cook and State of Illinois, have invented a new, useful, and Improved Hame Chafe and Hook, of which the following is a full, clear, and exact description, which will enable others skilled in the art to which my invention appertains to make and use the same, reference being had to the accompanying drawings, forming a part hereof, and in which—

Figure 1 is a side view of a hame provided with my improved chafe and hook; Fig. 2, a top or plan view thereof, and Fig. 3 a perspective representation of the chafe and hook detached.

Like letters of reference indicate like parts.

The object of my invention is to make a chafe and hook which will be simple in its construction and cheap, and which may be placed upon the market as a separate and independent article of manufacture, ready for the use to which it is intended to be applied, and which may be applied to use with facility in connection with hames provided with staples, loops, or other devices by means of which the tugs or chains may be connected to the hames.

To this end my invention consists in making a chafe and hook in one piece of metal, one end of which is made hook-shaped, and the other end of which is made flat and sufficiently large to serve as a chafe, the hooked part being bent back, so that the part intended to serve as a chafe will, in use, lie between the hook and the pads of the collar, and a sufficient space exist between the hook and chafe to admit of the tug-clip or chain being readily inserted into the hook, all of which will hereinafter more fully appear.

In the drawings, A represents a hame-bow, and B is a staple applied thereto. C is a tug, and D a tug-clip. E is the metallic hook and chafe. I make this part in one piece, one end of which is made hook-shaped, as shown at $a$, and the remaining part sufficiently flat and large to serve as a chafe, as shown at $a'$.

The hooked portion of this device is arranged as shown with relation to the remaining part or chafe, so that in use the latter part will lie between the hook and the pads of the collar. Sufficient space also exists between the hook and the chafe to allow the tug-clip to be readily applied to the hook. The hook is also sufficiently open to allow it to be passed through the staple, as shown.

That part of the device which is intended to serve as a chafe may be of any form which will admit of that function being performed by it. It may also be sufficiently thin or flexible to adapt itself to collars or pads varying somewhat from each other in form, and to the motion caused by the movement of the horse. This flexibility may also be produced by making thin some portion of the neck between the hook and the chafe; but I do not herein intend to restrict myself to the chafe and hook when rendered flexible in any part for the purpose referred to, nor to mere form when the form does not constitute an essential feature of my invention; but,

Having thus described my invention, what I claim as new, and desire to secure by Letters Patent, is—

A hame chafe and hook made in one piece, and consisting of the hook-shaped part $a$, and of the broad and flat part or chafe $a'$, the latter being bent back underneath the said hook, and the bent neck uniting the said parts, holding them sufficiently apart to allow the device to be hooked to the staple of a hame, and to allow the tug to be applied to the hook, substantially as and for the purposes specified.

COTTON H. ALLEN.

Witnesses:
JAMES J. NOBLE,
M. BYRON RICH.